Oct. 23, 1962  P. W. HOWELLS ET AL  3,060,380
SIDEBAND DETECTOR CIRCUIT
Filed Feb. 3, 1958  6 Sheets-Sheet 1
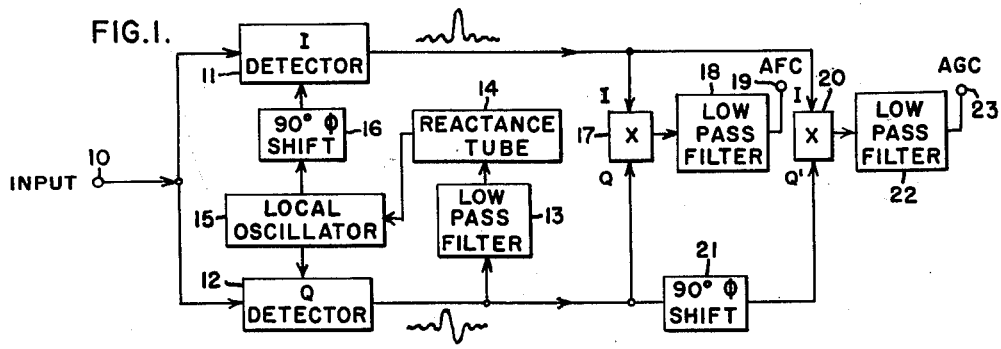
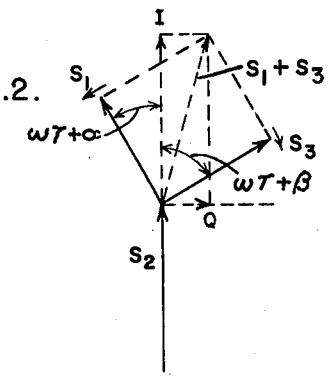
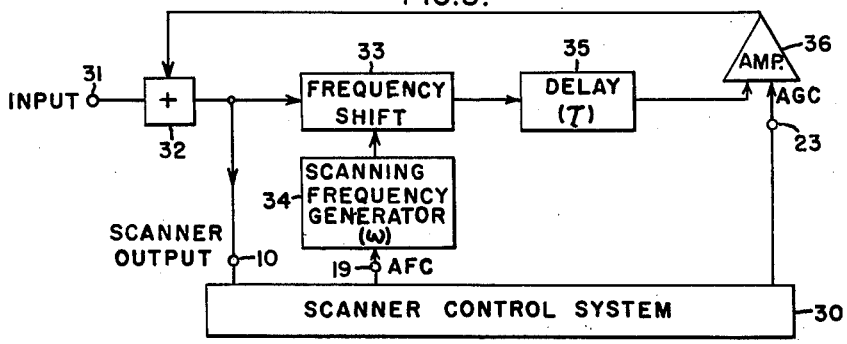
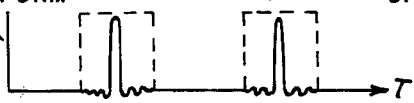
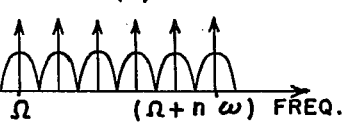
INVENTORS:
PAUL W. HOWELLS,
MANUEL J. DOMINGUEZ,
BY T. E. Kristofferson
THEIR ATTORNEY.

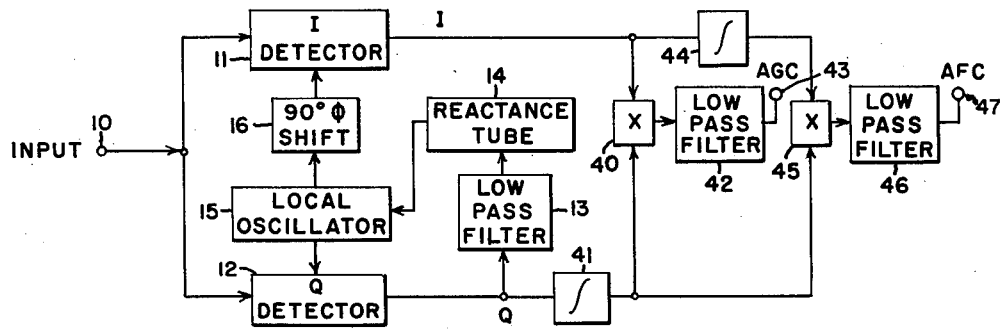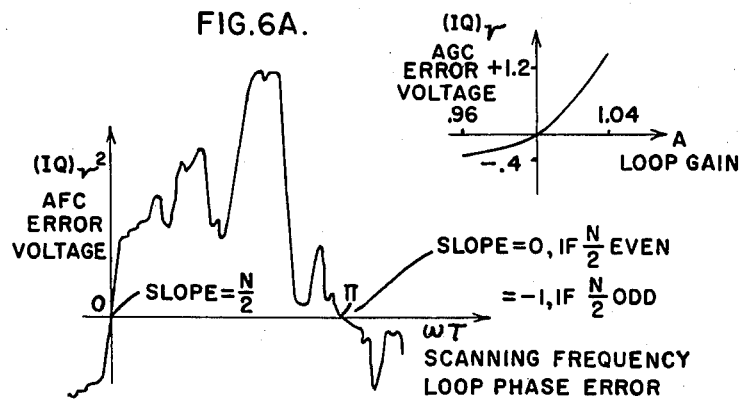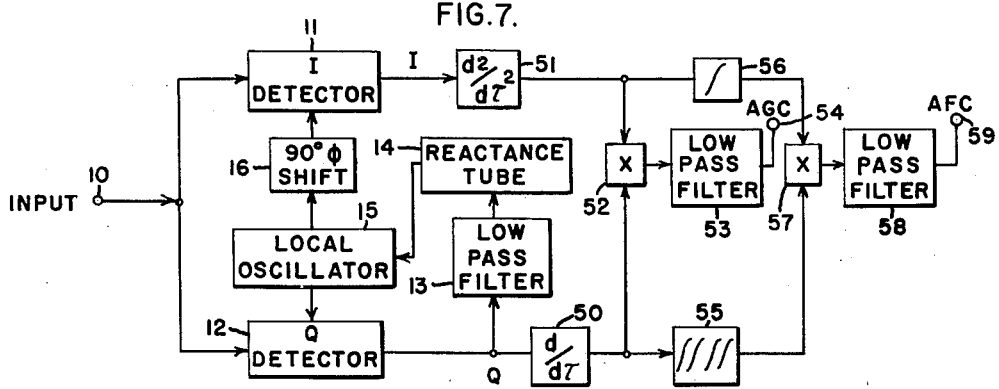

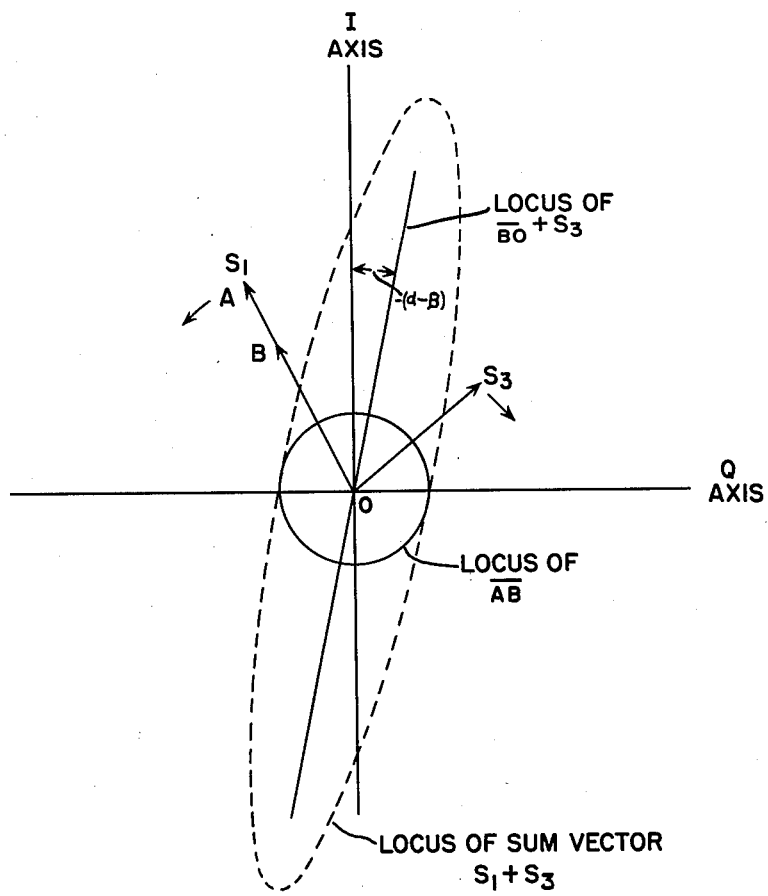

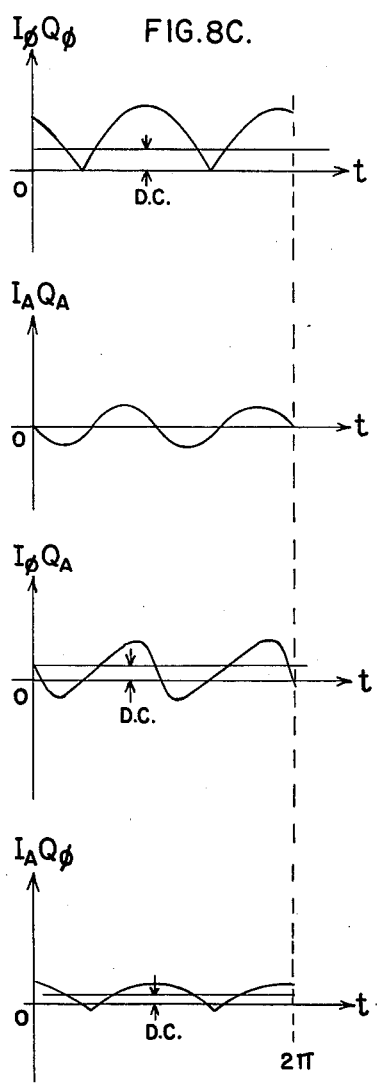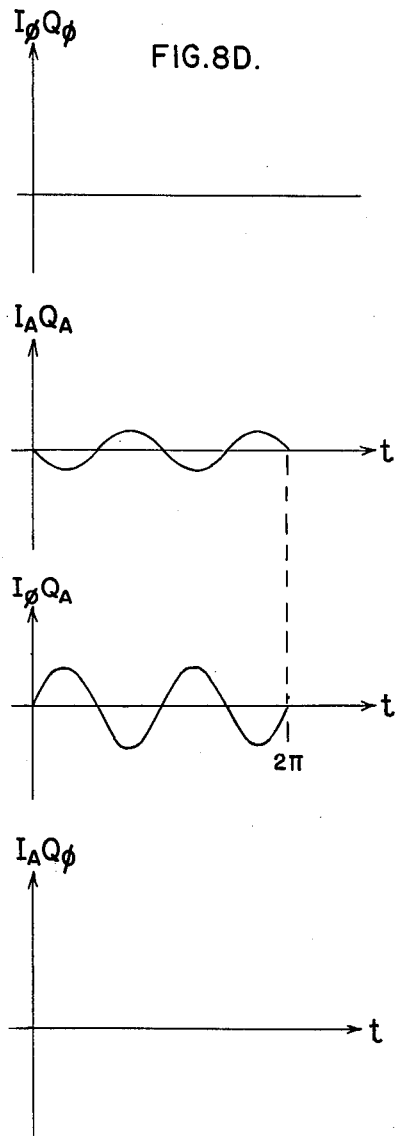

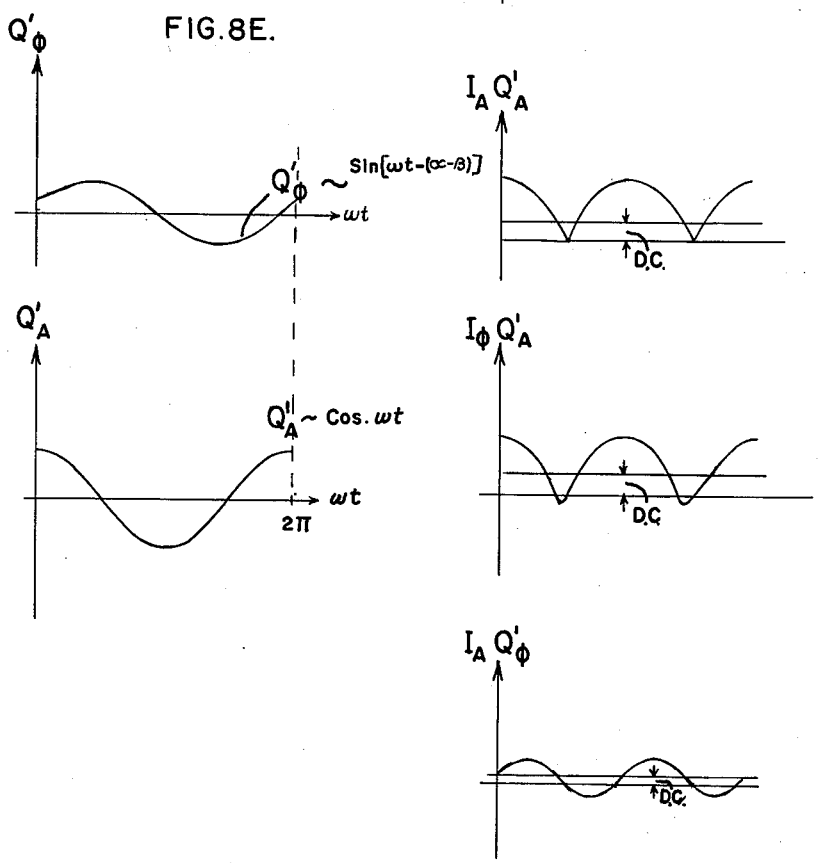

ately derived. More particularly, the invention

United States Patent Office 3,060,380
Patented Oct. 23, 1962

3,060,380
SIDEBAND DETECTOR CIRCUIT
Paul W. Howells, Morrisville, and Manuel J. Dominguez, Central Square, N.Y., assignors to General Electric Company, a corporation of New York
Filed Feb. 3, 1958, Ser. No. 713,053
18 Claims. (Cl. 324—77)

This invention relates to a measuring circuit adapted to measure the relative amplitude of a pair of sidebands and the difference in their phase displacement with respect to a center frequency, each of which measurements may be independently derived. More particularly, the invention relates to such a measuring circuit used in a control circuit for maintaining the amplitudes of the sidebands equal and their phases equally and oppositely displaced with respect to the center frequency.

Prior art circuits have attempted to maintain only the vector resultant of pairs of sidebands in phase with a center frequency by controlling their amplitude and phase with respect to the center frequency without concern as to whether the amplitudes alone and the difference in phase displacements alone are equal and zero respectively. This leads to many stable points for which the vectors may add to give the proper resultant. For certain applications, such as synchronizing a system of the type described in co-pending application Serial No. 712,282, Sidney Applebaum, filed on January 30, 1958, which is assigned to the same assignee as the present invention, and now Patent No. 2,997,650, it becomes necessary to define a unique stable point such that each pair of sidebands has substantially equal amplitude and substantially equal and opposite phase displacement from the associated center frequency. Accordingly, it is an object of this invention to provide circuitry capable of measuring and maintaining such a stable point.

Another object of this invention is to obtain a measure of the difference in amplitude of a pair of sidebands.

Still another object of this invention is to obtain a measure of the difference in phase displacements of a pair of sidebands relative to a center frequency.

Still another object of this invention is to employ the measured amplitude difference and differences in phase displacements to control the amplitude and phase of the sidebands such that the amplitudes will be maintained substantially equal and the phases with respect to the center frequency will have substantially odd symmetry.

A further object of this invention is to provide amplitude control in order to maintain the amplitudes of a pair of sidebands equal.

A still further object of this invention is to provide phase control in order to maintain the phases with respect to a center frequency with substantially odd symmetry.

A still further object of this invention is to weight the measures representative of the difference in amplitude and in phase displacements of the sidebands with respect to the center frequency such that the contribution of any pair of sidebands, remote from said center frequency, may be accentuated or deemphasized as desired.

In carrying out the invention in one form thereof a signal representative of a center frequency, and at least one pair of sidebands above and below the center frequency, is fed to an in phase detector and a quadrature detector where it is synchronously detected against a frequency provided by a local oscillator which is fed directly to the quadrature detector and through a 90° phase shift network to the in phase detector. The phase of the local oscillator is determined by passing the output of the quadrature detector through a low pass filter to a reactance tube, and connecting the output of the reactance tube to the local oscillator to maintain its phase in quadrature to that of the center frequency of the incoming signal. The outputs of the in phase and quadrature detectors are then compared, for instance, multiplied in a multiplying circuit and passed through a low pass filter to eliminate all but the difference frequency signals. The filter output is an indication of the difference in phase of the sidebands with respect to the center frequency. Either the output of the in phase detector or the quadrature detector may then be phase shifted approximately 90°, and the two signals are again multiplied and fed through a low pass filter to eliminate all but the difference frequency terms in order to obtain a measure of the total amplitude difference between the combined upper and combined lower sidebands.

Another form of the invention utilizes the difference signals described above by connecting them back to the circuitry of the source of the incoming signal in order to control the amplitudes and the phases of the sidebands.

The novel features characteristic of the invention are set forth with particularity in the appended claims. The invention itself, however, together with further objects and advantages thereof, can best be understood by reference to the following description taken in connection with the accompanying drawings in which:

FIG. 1 is a block diagram of one form of the invention for measuring the difference in amplitude and phase displacement with respect to the center frequency of a pair of sidebands, FIG. 2 is a vector diagram showing the relationship of a center frequency with a particular pair of sidebands, FIG. 3 is a block diagram illustrating the application of the circuitry of FIG. 1 to a recirculating delay line loop for controlling the amplitude and the phase of the sidebands of a signal circulating therein, FIG. 4 is a diagram illustrating selected waveform and frequency spectrum information representative of a circuit of FIG. 3, FIG. 5 is a block diagram showing an alternative embodiment to that of FIG. 1 which provides weighting of the difference signals obtained.

FIG. 6 is a graph representative of weighted AFC and AGC error voltages in the circuit of FIG. 5 for a signal incorporating eight pairs of sidebands around a center frequency.

FIG. 7 is a block diagram of an additional alternative embodiment for dealing with noisy input signals and providing properly weighted measures of the difference signals desired.

Figure 8B:
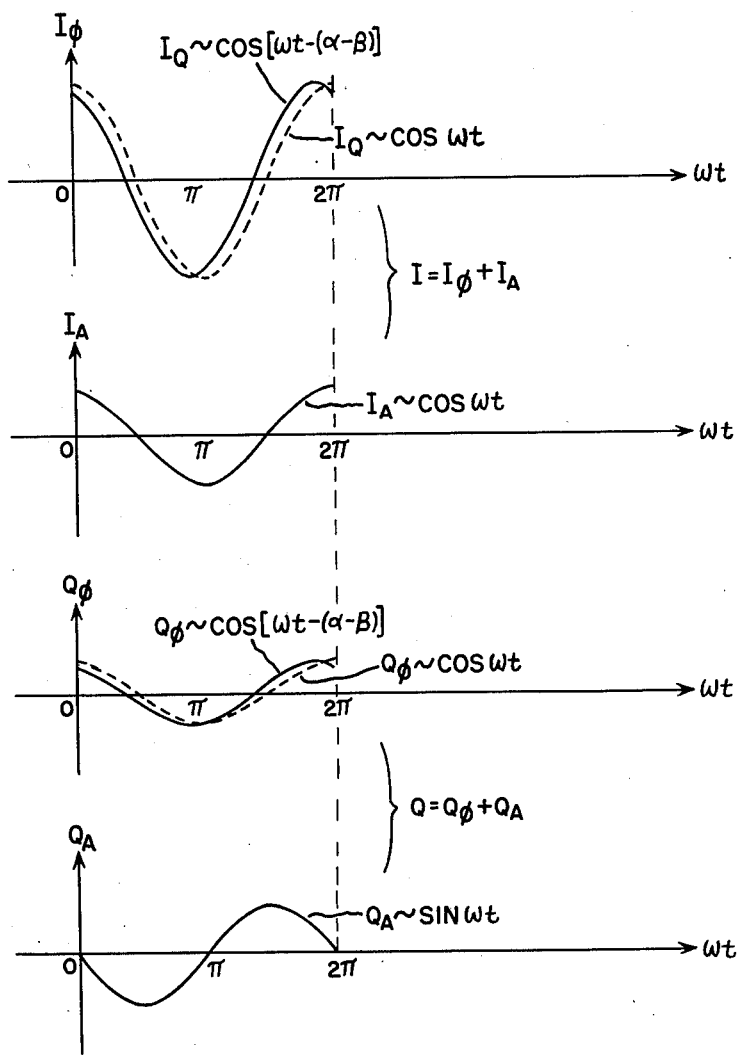
FIG. 8 is a group of graphs illustrating the operation of the circuit of FIG. 1.

Turning now to the drawings, in FIG. 1 there is illustrated an input terminal 10 to which a source may be connected to provide a signal having a center frequency and at least one pair of sidebands, above and below. This signal is connected by means of terminal 10 to an in phase detector 11 and a quadrature detector 12 which provides means for in phase and quadrature detecting the input signal with respect to the center frequency. In order to provide a reference frequency equal to the center frequency and in phase quadrature to it, the output of quadrature detector 12 is connected through a low pass filter 13 to a reactance tube circuit 14 which is used to control the frequency of a local oscillator 15, maintaining it in phase quadrature to the center frequency of the incoming signal. The output of oscillator 15 is connected to quadrature detector 12 and through a 90° phase shift network 16 to in phase detector 11 in order to provide the proper reference signal for in phase and quadrature detecting.

The outputs of detectors 11 and 12 are connected to a comparison circuit here shown to be a multiplying circuit 17 where they are multiplied. The output of multiplier 17 is fed through a low pass filter 18 in order to remove all but the difference frequency terms. The output of low pass filter 18, available on a terminal 19, is then a representation of the differences in phase displacement of each pair of sidebands with respect to the center frequency.

In addition, the output of detectors 11 and 12 may be multiplied in a second multiplying circuit 20 after phase shifting one of them 90°. This is shown in FIG. 1 to be the output of quadrature detector 12 which is fed through a 90° phase shift circuit 21 before being connected to multiplier 20. The output of multiplier 20 is then passed through an additional low pass filter 22, the output of which is available on terminal 23 and is a signal representative of the amplitude differences of each pair of sidebands of the input signal.

Each of the elements illustrated in the block diagram of FIG. 1 may be conventional circuits of the type described. In particular, the following conventional circuits are representative of those which may be employed in order to implement the block diagram of FIG. 1.

A ring modulator or multiple grid detector may be used to implement detectors 11 and 12. Low pass filters 13, 18 and 22 may be R-C filters or any other known type of low pass filter. The design of filter 13 is dictated by the required stability of the automatic phase control loop including elements 12, 13 and 15. Reactance tube 14 may be any known reactance tube circuit, a non-linear capacitor or elements 14 and 15 might be combined in a voltage sensitive oscillator. Oscillator 15 may be a Hartley or any other known oscillator. Phase shift network 16 may be any type such as a tuned transformer giving 90° phase shift at a single frequency. Multipliers 17 and 20 may be a multiple grid tube such as detectors 11 and 12 or any other suitable comparing circuit but shall be operated without limiting either input signal. Phase shift network 21 may be a wide-band network such as the Dome network, or an active R-C network. It will be understood that these examples are only exemplary and are not intended to be in any way limiting on the invention.

Turning now to a more complete description of the operation of the circuit of FIG. 1, if the incoming signal is such that its amplitude has even symmetry about the center frequency and its phase has odd symmetry about the center frequency, there will be no quadrature component. If the phase is not odd, that is, if the sidebands are not equally spaced with respect to the center frequency phase, there will be a quadrature component which as detected will be in phase with the detected in phase component. Therefore, a multiplier multiplying two of these detected signals will show a D.-C. output because of the two signals in phase, but a multiplier shifting one of the signals 90° in multiplying will produce no D.-C. output. In the case of an error in amplitude there will be again detected a quadrature signal which is now 90° out of phase with the detected in phase signal and therefore the multiplier multiplying the detected I signal with the detected Q signal, which is 90° out of phase from this, will produce no D.-C. output, while the multiplier multiplying the I detected signal by the 90° shifted Q signal will produce a D.-C. output. The IQ multiplier therefore provides as its output voltage a measure of the phase errors in the input signal while the IQ' multiplier provides an output representative of the amplitude errors in the input signal.

The discussion so far has assumed either an amplitude or a phase error in the input signal. Operation under the more general conditions of combined amplitude and phase errors can be illustrated by an input signal which has a frequency spectrum comprised of three frequencies, one of which is approximately the arithmetic mean of the other two. The signal components corresponding to the three frequencies are represented in the phaser diagram of FIG. 2 by the phasers $S_1$, $S_2$, and $S_3$. The phaser $S_2$ represents the arithmetic mean frequency component which is taken to be the stationary reference of the diagram. Only the motion of the phasers $S_1$, which is analogous to a lower sideband, and $S_3$, which is analogous to an upper sideband, relative to said reference are considered. If the frequency separation of each sideband with respect to said reference is denoted by $\omega$, then the $S_1$ phaser rotates counterclockwise at an angular rate $\omega$ and has an instantaneous phase angle equal to $(\omega t + \alpha)$ and the $S_3$ phaser rotates clockwise at an angular rate $\omega$ and has an instantaneous phase angle equal to $(\omega t + \beta)$. The difference in phase displacement of the pair of sidebands relative to the reference center frequency is therefore denoted by the fixed phase angle $(\alpha - \beta)$. Furthermore, the difference in amplitudes of the pair of sidebands is denoted by the difference in the magnitudes of the sideband phasers, viz. $|S_1| - |S_3|$. Measures of the angle $(\alpha - \beta)$ and the amplitude $|S_1| - |S_3|$ are the desired outputs of the AFC and AGC terminals, 19 and 23 respectively, in the circuit of FIG. 1. To show that these desired outputs are realized, the I and Q detector outputs are described in terms of the phasers of FIG. 2. The I detector produces an I signal that is represented by the projection of the sum vector, $S_1 + S_3$, upon the reference $S_2$ axis, whereas the Q detector produces a Q signal that is represented by the sum vector projection upon the axis in quadrature with the reference axis. The phasers $S_1$ and $S_3$ in FIG. 2 are depicted as having both amplitude and phase errors. It is always possible to represent said $S_1$ and $S_3$ phasers by three equivalent phasers such as $\overline{AB}$, $\overline{BO}$ and $S_3$ shown in FIG. 8A. The phaser $\overline{BO}$ is chosen so that it has an amplitude equal to that of $S_3$ and so that it is colinear with $S_1$. The phaser $\overline{AB}$ is chosen so that the vector sum of $\overline{AB}$ and $\overline{BO}$ equals the original phaser $S_1$. It is now possible to discuss the combined amplitude and phase errors of the sideband phasers $S_1$ and $S_3$ in terms of the phase only error of the phasers $\overline{BO}$ and $S_3$ and the amplitude only error of the phaser $\overline{AB}$ and a zero amplitude phaser. The resulting I and Q signals are now represented as the I axis and Q axis projections of the sum vector $(\overline{BO} + S_3)$ plus the I axis and Q axis projections of $\overline{AB}$.

As the phasers $\overline{BO}$ and $S_3$ rotate in opposite directions at the angular rate $\omega$, the tip sum vector $\overline{BO} + S_3$ periodically traces out the straight line locus shown in FIG. 8A. Said locus forms an angle with the I axis which is equal to the difference in phase displacement of $\overline{BO}$ and $S_3$ or equivalently $S_1$ and $S_3$ relative to the reference center frequency of $S_2$. The I and Q axis projections of the sum vector $(\overline{BO} + S_3)$ are denoted by $I_\phi$ and $Q_\phi$, respectively, to distinguish them from the total I and Q signals which include the projections of the $\overline{AB}$ phaser.

The remaining phaser $\overline{AB}$ rotation coincides with the $\overline{BO}$ phaser rotation. The locus traced out by the $\overline{AB}$ phaser is a circle of radius equal to the magnitude of $\overline{AB}$ as shown in FIG. 8A. The I and Q axis projections of $\overline{AB}$ are denoted by $I_A$ and $Q_A$, respectively. The total I signal is therefore equal to $I_\phi$ plus $I_A$ and the total Q signal is equal to $Q_\phi$ plus $Q_A$.

During one revolution of the phasers $S_1$ and $S_3$, the I and Q signals produced are those depicted by the solid lines in FIG. 8B. The output of the IQ multiplier is the product of $I_\phi + I_A$ and $Q_\phi + Q_A$. Said IQ multiplier output is therefore comprised of the sum of the four product terms illustrated in FIG. 8C. After smoothing, only the sum of the D.C. components indicated in FIG. 8C remain. Said D.C. is reduced to zero when the difference in phase displacement relative to the reference frequency, viz. $(\alpha - \beta)$, is reduced to zero. This occurs when the straight-line locus in FIG. 8A coincides with the I axis, i.e., when $\alpha$ and $\beta$ are equal. The dotted lines in FIG. 8B indicates the changes which occur when α is made equal to β. FIG. 8D shows that the IQ multiplier then contains no terms with a D.C. component, hence after smoothing the output terminal 19 of the circuit in FIG. 1 has a zero value. It is noted that the zero output condition at terminal 19 is controlled only by the phase error of the sidebands, viz., α—β and not by the amplitudes of the sidebands.

The output of the IQ' multiplier can be described in much the same way. Now the Q signal comprised of $Q_\phi + Q_A$ is shifted in phase by 90° as shown in FIG. 8E. The IQ' products are depicted in FIG. 8F which shows that the only term in the IQ' product that has no D.C. term is the $I_\phi Q_\phi'$. Now when the sidebands have equal amplitudes, the phaser $\overline{AB}$ in FIG. 8A reduces to zero and therefore both $I_A$ and $Q_A$ reduce to zero. Consequently, in the IQ' product, the three terms which can provide a D.C. output at terminal 23 of the circuit in FIG. 1 are reduced identically to zero. The remaining term $I_\phi Q_\phi'$ never has a D.C. component, hence equal sidebands result in a zero output at terminal 23.

Illustrating the foregoing mathematically, the output of the I and Q detectors 11 and 12 after smoothing will be $$I = |S_1| \cos(\omega t + \alpha) + |S_3| \cos(\omega t + \beta) \quad (1)$$

$$Q = |S_1| \sin(\omega t + \alpha) - |S_3| \sin(\omega t + \beta) \quad (2)$$

where it is assumed that the D.-C. output due to $S_2$ is rejected. Taking the product of Equations 1 and 2 from mulitplier 17 after smoothing in filter 18 to eliminate all terms except those representative of the difference frequencies, we have an automatic frequency control voltage represented as $$IQ = |S_1 S_3| \sin(\alpha - \beta) \quad (3)$$

Equation 3 demonstrates that if α and β are equal the product, IQ will then be zero, and the measure of difference in phase displacement of the sidebands with respect to the center frequency is zero. The signal Q', which is derived by passing the output of quadrature detector 12 through a 90° phase shift network 21, can be set out by substituting cosines for sines in Equation 2, thus $$Q' = |S_1| \cos(\omega t + \alpha) - |S_3| \cos(\omega t + \beta) \quad (4)$$

Again, smoothing to eliminate all except the difference frequency terms after multiplying Equations 1 and 4 in multiplier 20, we arrive at the product $$IQ' = \frac{|S_1|^2 - |S_3|^2}{2} \quad (5)$$

This product demonstrates that the output of multiplier 20 is representative of only amplitude and contains no phase terms. Thus, the circuit of FIG. 1 has derived a measure of difference in ampltiude in the sidebands and difference in phase displacement with respect to the center frequency.

In FIG. 3 there is illustrated a block diagram of an embodiment employing the circuit of FIG. 1 to control a recirculating delay line of the type described in the Applebaum application cited previously. The scanner control system 30 is essentially the circuitry of FIG. 1 with an input terminal 10, a frequency control output terminal 19, and a gain control output terminal 23. A signal to be recirculated in the recirculating delay line portion of this circuit is applied to an input terminal 31 which is one input of an adding circuit 32. The output of the adding circuit 32 is connected to the input terminal 10 of scanner control system 30 and to the input of a frequency shift circuit 33. The amount of frequency shift provided by frequency shift circuit 33 is controlled by a scanning frequency circuit 34 which is, in turn, controlled by connecting the output terminal 19 of scanner control system 30 to the input of scanning frequency circuit 34. The output of frequency shift circuit 33 is connected through a delay element 35 and an amplifier 36 back to a second input of adder 32. The gain of amplifier 36, and thus the loop gain of the recirculating loop, is controlled by connecting output terminal 23 of scanner control system 30 to a second input of amplifier 36.

The operation of the circuit of FIG. 3 can be given in more detail as follows. As described in the above referenced Applebaum application, the adder 32, frequency shift network 33, delay 35, amplifier 36, and scanning frequency generator 34 may be considered to be a scanner which performs coherent pulse to pulse IF integration. Adder 32 accepts an input pulse train and recirculates it through delay line 35, shifting it each time in frequency shift network 33 by the scanning frequency provided by frequency generator 34, before each new recirculation. The delay provided by delay 35 matches the repetition rate of the input pulse train applied on terminal 31 so that after $n$ recirculations $n$ input pulses will emerge simultaneously at the scanner output, or at terminal 10 the input of scanner control system 30. Each pulse will have been frequency shifted a different number of times so that the scanner outputs spectrum is as shown in FIG. 4B, a family of pulse spectra spaced by the scanning frequency $\omega$. If the input had been C.W. the output spectrum would be a simple family of lines which correspond to the family of continuous spectra of the pulse carriers. Ideally, these lines should have a linear phase relation, the phase difference between adjacent lines being the net phase shift of the frequency in one circulation through the scanner loop. With this linear phase relation the family of lines forms a repetitive $$\frac{\sin x}{x}$$

i.e., $$\frac{\sin nx}{n \sin x}$$

pulse train recurring at the scanning frequency. The time position of the pulses of FIG. 4B depends on the linear phase slope as determined by the input frequency. The effect of the pulse input is to gate the output pulse train by the input pulse envelope as shown by the dotted lines of FIG. 4A. If the scanning frequency $\omega$ equals the input pulse bandwidth only one output pulse will appear during one input pulse width. Such an output pulse is illustrated by the solid line of FIG. 4A.

The frequency resolution of this scanner is determined by the width of these output pulses and for a given number of recirculations minimum width is achieved by the linear phase relation mentioned, and by a flat output spectrum amplitude, which can be achieved by maintaining a loop gain of unity. This loop gain of unity may be maintained by adjusting the gain of amplifier 36 by such means as connecting output terminal 23 of scanner control system 30 to it. For various reasons it may be desirable to shape the amplitude and phase of the output spectrum, but in general, the amplitude should have even and the phase odd symmetry about the spectrum center. However, errors in scanning frequency may produce a non-linear phase term which tends to disperse the in pulse and errors in loop gain may produce nonuniform amplitudes with similar effects. For the form of scanner shown in FIG. 3 it may be shown that with a unit C.W. input the output term after the $n$th recirculation is $$S_n = A^n \cos\left[(\Omega + n\omega)t + \phi + n(\theta - \Omega\tau) + \frac{(n+1)n}{2}\omega\tau\right] \quad (6)$$

where

A is the loop gain
$\tau$ is the loop delay
$\Omega$ is the input carrier frequency
$\phi$ is the input carrier phase
$\omega$ is the scanning frequency $\theta$ is the scanning phase, and
$t$ is time This equation describes what happens in terms of loop gain and scanning frequency shift. The output signal available at scanner output terminal 10, which is the input to the scanner control system 30, may be given as $$S_0 = \sum_{n=0}^{N} S_n \qquad (7)$$

The purpose of the control system illustrated in FIG. 3 is to control the amplitude and the scanning frequency such that the sum illustrated in Equation 7 has a linear phase relationship and even symmetry in amplitude. A loop gain A other than unity will cause the spectrum amplitude to become exponentially tapered with consequent distortion of the output pulses. The non-linear phase term $$\frac{(n+1)n}{2}\omega\tau$$

may be separated into a linear and square-law component, and produces a further time shift of the output waveform plus a dispersion of the output pulses due to the square-law component. These effects may be eliminated by locking the scanning frequency to the loop delay so that $\omega\tau = 2m\pi$ where $m$ is an integer. The control circuitry therefore must determine the flatness, or more generally, the variations from even symmetry of the output spectrum and develop AGC error voltage for control of loop gain, and detect any square-law component of output phase and develop AFC voltage for control of the scanning frequency. The above description and equations illustrated an embodiment employing a scanner control system 30 of the type illustrated in FIG. 1 and a scanning system containing an output signal such as that described as the input in FIG. 1 and requiring control signals illustrative of the measure of difference in amplitude of the sidebands and the difference in phase displacement of the sidebands with respect to their center frequency for controlling the scanning system in order to operate on the scanning system input signals to provide the desired output.

Under certain circumstances it is desirable to weight the difference measurements of amplitude and phase displacement provided by the circuit of FIG. 1. One way of accomplishing this is illustrated in the block diagram of FIG. 5 which are identical to those shown in FIG. 1 have been numbered with the same numerals. The same type of input signal as applied to FIG. 1 is applied to input terminal 10 of FIG. 5 and the operation of detectors 11 and 12, low pass filter 13, reactance tube 14, local oscillator 15, and phase shift network 16 is identical to that described in connection with FIG. 1. In FIG. 5 the output of quadrature detector 12 is connected to a multiplier 40 through an integrating circuit 41. Integrating circuit 41 provides a phase shift and a weighting factor of $$\frac{1}{r}$$

where $r$ is an integer corresponding to the frequency separation of the sideband from the center frequency and, in addition, provides a simpler phase shifting device than that described in connection with the circuit of FIG. 1. The output of detector 11 is also applied to multiplier circuit 40 and multiplied with the integrated output of detector 12. The output of multiplying circuit 40 is passed through a low pass filter 42 in order to remove all but the difference frequency terms. The output of low pass filter 42 is available on terminal 43 as a weighted measure of the amplitude differences of the sidebands of the input signal. In addition, the output of detector 11 is connected to an integrating circuit 44 and the outputs of integrating circuits 41 and 44 are connected to a second multiplying circuit 45. The phase shift contributed by integrator 41 is nullified by that contributed by integrator 44, and a second weighting factor of $$\frac{1}{r}$$

is contributed, supplying a total weighting factor of $$\frac{1}{r^2}$$

The output of multiplier 45 is then connected through a low pass filter 46 to an output terminal 47 to provide a weighted measure of the difference in the phase displacements of the sidebands with respect to the center frequency of the input signals.

The operation of the circuit of FIG. 5 is similar to that previously discussed with the exception that, in addition, a weighting factor is provided in order to weight pairs of sidebands according to their separation from center frequency. Employing such a weighting, with more than a single pair of sidebands, Equation 3 becomes $$IQ = A^{2n} \sum_{r=1}^{N/2} \sin r^2 \omega \tau \qquad (8)$$

and Equation 5 becomes $$IQ' = \frac{A^{2n}}{2} \sum_{r=1}^{N/2} A^{2r} - A^{-2r} \qquad (9)$$

Each term of these summations represents a contribution of a pair of sidebands. The relative effect of each pair may be modified as desired by the insertion of a proper filter in the I or Q channels preceding the multipliers. The weights should be chosen to obtain the most desirable form of AFC function; for example, in the scanning system application the AFC voltage is a function of the scanning frequency loop phase shift $\omega t$. We would like this function to have the steepest possible positive slope at the desired stable point, $\omega t = 0$, for good sensitivity; a negative slope at $\omega t = \pi$ to make this an unstable point, and no other equilibrium points, i.e., $IQ = 0$ points, in between. In its unweighted form there are many points at which IQ goes to zero, half of which would be undesirable stable points. To correct this, we need at least a $$\frac{1}{r^2}$$

weighting of the sideband pairs. This ensures the slope of the error function is negative at $\omega t = \pi$, that each pair of sidebands contributes equally to the positive slope at the desired control point, $\alpha t = 0$, and that there are no undesired zeros in between. The AGC error voltages is a function of the loop gain A, and in its unweighted form the outside pairs of sidebands contribute most heavily to its slope at the desired control point, $A = 1$. To equalize the effects of all sidebands, the weight of $$\frac{1}{r}$$

may be used. As mentioned above the circuit of FIG. 5 will provide these weights, and with the desired weights the AFC and AGC error voltages become $$(IQ)_r^2 = A^{2m} \sum_{r=1}^{N/2} \frac{\sin r^2 \omega t}{r^2} \qquad (10)$$

$$(IQ')_r = \frac{A^{2m}}{2} \sum_{r=1}^{N/2} \frac{A^{2r} - A^{-2r}}{r} \qquad (11)$$

For the case in which $N = 16$, or eight pairs of sidebands are clustered around a center frequency, the AFC and AGC error voltages take the form shown in FIGS. 6A and 6B, respectively, for the circuit illustrated in FIG. 5. The weighting factors used here suggested a means of replacing the difficult 90° phase shifting network with a more friendly integrating network which offers the desired $$\frac{1}{r}$$

weighting of the I or Q video channels along with the desired 90° phase shift. In other embodiments operating in other environments different weighting factors may prove more desirable.

In FIG. 7 there is illustrated such another alternative to the embodiment disclosed in FIG. 1 providing a different weighting factor, $r^3$ for amplitude and $$\frac{1}{r^2}$$

for frequency. Again, where identical components have been employed, the same numerals are used to designate the elements. Thus, the input signal is applied to a terminal 10 and the operation of detectors 11 and 12, low pass filter 13, reactance tube 14, local oscillator 15, and phase shift network 16 is similar to that discussed in connection with FIG. 1. If the input signal should be noisy it may be desirable to differentiate rather than integrate in order to provide accurate AGC difference information. In order to do this a differentiating circuit 50 is connected to the output of detector 12 and a double differentiating circuit 51 is connected to the output of detector 11. Any odd number of differentiations would supply the necessary phase shift required, with a different accompanying weighting factor for the associated output signal. The outputs of differentiating circuits 50 and 51 are connected to a multiplier 52 where they are multiplied and fed through a low pass filter 53 to an output terminal 54 for providing weighted AGC information. In addition, the output of differentiator 50 is fed through a quadruple integration circuit 55, and the output of differentiator 51 is fed through an integration circuit 56 both to another multiplier circuit 57. In order to obtain the proper phase information and weighting for an example such as illustrated in FIG. 3, the number of integrations in this loop must be at least two in excess of the number of differentiations previously performed. Thus, it can be seen that integrator circuit 56 might integrate twice while integrator circuit 55 integrates three times and the same end result would be achieved. The output of multiplier 57 is fed through low pass filter 58 to an output terminal 59 for providing a weighted measure of the difference of the phase displacement of the sidebands with respect to the center frequency. The operation of the circuit of FIG. 7 is similar to that previously described.

Obvious modifications of the circuitry disclosed herein would include the provision of a bias on the control connections of FIG. 3 to provide an operating condition where it may be desired to have a given amplitude difference and difference in phase displacement maintained between a pair or pairs of sidebands. The circuits for comparing or multiplying to obtain the component of the detected Q which is in phase with the detected I and for obtaining the component of the detected Q which is in quadrature phase with the detected I can be any detecting means capable of such a comparison. Also, though operation using two signals in quadrature yields outputs desirable for the applications discussed, it will be understood that a variation from the quadrature relationship will result in a distorted signal which may well prove useful in other environments.

While the principles of the invention have now been made clear by the illustrative embodiments, there will be immediately obvious to those skilled in the art many modifications in structure, arrangement, proportions, elements, components used in the practice of the invention, and otherwise, which are particularly adapted for specific environments and operating requirements without departing from these principles. The appended claims are therefore intended to cover and embrace any such modification, within the limits only of the true spirit and scope of the invention.

What we claim and desire to secure by Letters Patent of the United States is:

1. A sensing circuit comprising, input means adapted for connection to a source of signals having a center frequency and at least one upper and one lower sideband, first detecting means for in-phase detecting said signals with respect to said center frequency, second detecting means for quadrature detecting said signals with respect to said center frequency, the inputs of said first and said second detecting means being connected to said input means, first comparison means connected to the outputs of said first and second detecting means for comparing the output of said in-phase and quadrature detecting means to obtain a quantity proportional to the difference in the phase displacement of said sidebands with respect to the phase of said center frequency, phase shifting means connected to the output of one of said detecting means for shifting its output substantially 90°, and second comparison means connected to the output of said phase shifting means and the output of the other of said detecting means to obtain a quantity proportional to the amplitude difference of said sidebands.

2. A sensing circuit comprising, input means adapted for connection to a source of signals having a center frequency and at least one upper and one lower sideband and an even number of sidebands, first detecting means for in-phase detecting said signals with respect to said center frequency, second detecting means for quadrature detecting said signals with respect to said center frequency, the inputs of said first and said second detecting means being connected to said input means, first multiplying means connected to the output of said first and second detecting means for multiplying the output of the in-phase and quadrature detecting means to obtain a representation of difference in the phase displacement of said sidebands with respect to the phase of said center frequency, phase shifting means connected to the output of one of said detecting means for phase shifting its output by substantially 90°, and second multiplying means connected to the output of said phase shifting means and to the output of the other of said detecting means to obtain a representation of the amplitude difference of said sidebands.

3. A sensing circuit comprising, input means adapted for connection to a source of signals having a center frequency and at least one upper and one lower sideband and an even number of sidebands, first detecting means for in-phase detecting said signals with respect to said center frequency, second detecting means for quadrature detecting said signals with respect to said center frequency, the inputs of said first and second detecting means being connected to said input means, first multiplying means connected to the outputs of said first and second detecting means for multiplying the outputs of the in-phase and quadrature detecting means to obtain a representation of difference in the phase displacement and the sum of the phase displacement of said sidebands with respect to the phase of said center frequency, phase shifting means connected to the output of one of said detecting means for phase shifting its output substantially 90°, and second multiplying means connected to the outputs of the shifted detector and the other detector to obtain a representation of the amplitude difference of said sideband.

4. A sensing circuit comprising, input means adapted for connection to a source of signals having a center frequency and at least one upper and one lower sideband, first detecting means for in-phase detecting said signals with respect to said center frequency, second detecting means for quadrature detecting said signals with respect to said center frequency, the inputs of said first and second detecting means being connected to said input means, and means for multiplying the output of said phase and quadrature detecting means to obtain a representation of difference in the phase displacements of said sidebands with respect to said center frequency.

5. A sensing circuit comprising, input means adapted for connection to a source of signals having a center frequency and at least one upper and one lower sideband, first detecting means for in-phase detecting said signals with respect to said center frequency, second detecting means for quadrature detecting said signals with respect to said center frequency, the inputs of said first and second detecting means being connected to said input means, phase shifting means connected to the output of one of said detecting means for phase shifting its output by substantially 90°, and multiplying means connected to the output of said phase shifting means and the other of said detecting means to obtain a quantity proportional to the amplitude difference of said sidebands.

6. A control circuit for maintaining a source of signals made up of a center frequency and at least one upper and one lower sideband such that each corresponding upper and lower sideband has equal amplitude and equal and opposite phase displacement from said center frequency comprising, said source of signals, first detecting means for in-phase detecting said signals with respect to said center frequency, second detecting means for quadrature detecting said signals with respect to said center frequency, the inputs of said first and second detecting means being connected to said source, first comparison means connected to the outputs of said first and second detecting means for comparing the output of said in-phase and quadrature detecting means to obtain a representation of difference in the phase displacement of said sidebands with respect to the phase of said center frequency, means for connecting the output of said first comparison means to said source for maintaining said phase displacements equal with respect to said center frequency, phase shifting means connected to the output of one of said detecting means for shifting its output substantially 90°, second comparison means connected to the output of said phase shifting means and the output of the other of said detecting means to obtain a representation of the amplitude difference of said sidebands, and means for connecting the output of said second comparison means to said source for maintaining the amplitude of corresponding upper and lower sidebands substantially equal.

7. A control circuit for maintaining a source of signals made up of a center frequency and at least one upper and one lower sideband and an even number of sidebands such that each corresponding upper and lower sideband has an equal amplitude and equal and opposite phase displacement from said center frequency comprising, said source, first detecting means for in-phase detecting said signals with respect to said center frequency, second detecting means for quadrature detecting said signals with respect to said center frequency, the inputs of said first and said second detecting means being connected to said source, first multiplying means connected to the outputs of said first and second detecting means for multiplying the output of said in-phase and quadrature detecting means to obtain a quantity proportional to the difference in the phase displacement of said sidebands with respect to the phase of said center frequency, means for connecting the output of said multiplying means to said source for maintaining said phase displacements equal with respect to said center frequency, phase shifting means connected to the output of one of said detecting means for shifting its output substantially 90°, second multiplying means connected to the output of said phase shifting means and the output of the other said detecting means to obtain a quantity proportional to the amplitude difference of said sidebands, and means for connecting the output of said second multiplying means to said source for maintaining the amplitude of corresponding upper and lower sidebands substantially equal.

8. A control circuit for maintaining a source of signals made up of a center frequency and at least one upper and one lower sideband and an even number of sidebands such that each corresponding upper and lower sideband is equal in amplitude and phase displacement from said center frequency comprising, said source of signals, first detecting means for in-phase detecting said signals with respect to said center frequency, second detecting means for quadrature detecting signals with respect to said center frequency, the inputs of said first and said second detecting means being connected to said source of signals, first multiplying means connected to the outputs of said first and said second detecting means for multiplying the output of the in-phase and quadrature detecting means to obtain a representation of difference in phase displacements and the sum of the phase displacement of said sidebands with respect to the phase of said center frequency, means for connecting the output of said first multiplying means to said source for maintaining said phase displacement equal with respect to said center frequency, phase shifting means connected to the output of one of said detecting means for shifting its output substantially 90°, second multiplying means connected to the output of said phase shifting means and the output of the other of said detecting means to obtain a representation of the amplitude difference of said sidebands, and means for connecting the output of said multiplying means to said source for maintaining the amplitude of corresponding upper and lower sidebands substantially equal.

9. A control circuit for maintaining a source of signals made up of a center frequency and at least one upper and one lower sideband such that each corresponding upper and lower sideband is equal in phase displacement from said center frequency comprising, said source of signals, first detecting means for in-phase detecting said signals with respect to said center frequency, second detecting means for quadrature detecting said signals with respect to said center frequency, the inputs of said first and said second detecting means being connected to said source of signals, multiplying means connected to the outputs of said first and second detecting means for multiplying the output of said in-phase and quadrature detecting means to obtain a quantity proportioned to the difference in the phase displacement of said sidebands with respect to the phase of said center frequency, and means for connecting the output of said multiplying means to said source for maintaining said phase displacements equal with respect to said center frequency.

10. A control circuit for maintaining a source of signals made up of a center frequency and at least one upper and one lower sideband such that each corresponding upper and lower sideband has equal amplitude comprising, said source of signals, first detecting means for in-phase detecting said signals with respect to said center frequency, second detecting means for quadrature detecting said signals with respect to said center frequency, the inputs of said first and said second detecting means being connected to said source of signals, phase shifting means connected to the output of one of said detecting means for shifting its output substantially 90°, multiplying means connected to the output of said phase shifting means and the output of the other of said detecting means to obtain a representation of the amplitude difference of said sidebands, and means for connecting the output of said multiplying means to said source for maintaining the amplitude of corresponding upper and lower sidebands substantially equal.

11. A sensing circuit comprising, input means adapted for connections to a source of signals having a center frequency and at least one upper and one lower sideband, first detecting means for in-phase detecting said signals with respect to said center frequency, second detecting means for quadrature detecting said signals with respect to said center frequency, the inputs of said first and said second detecting means being connected to said input means, integrating means connected to the output of one of said detecting means, and comparison means connected to the output of said integrating means and to the output of the other of said detecting means for comparing the integrated and non-integrated detected signals so as to obtain a weighted representation of the amplitude difference in said sidebands.

12. A sensing circuit comprising, input means adapted for connection to a source of signals having a center frequency and at least one upper and one lower sideband, first detecting means for in-phase detecting said signals with respect to said center frequency, second detecting means for quadrature detecting said signals with respect to said center frequency, the inputs of said first and said second detecting means being connected to said input means, weighting means connected serially to at least the output of one of said detecting means, and means for multiplying the detected signals after weighting to obtain the weighted representation of difference in the phase displacement of said sidebands with respect to said center frequency.

13. A control circuit for maintaining a source of signals made up of a center frequency and a plurality of pairs of upper and lower sidebands such that each pair of sidebands has substantially equal amplitude and substantially equal and opposite phase displacement from said center frequency comprising, said source of signals, first detecting means for in-phase detecting said signals with respect to said center frequency, second detecting means for quadrature detecting said signals with respect to said center frequency, the inputs of said first and said second detecting means being connected to said input means, first integrating means connected serially with said detecting means for integrating the output of said detecting means an odd number of times, and first comparison means connected for comparing said detected signals after integration to obtain a weighted representation of the amplitude difference of said sidebands, means for connecting the output of said first comparison means to said source for maintaining the amplitude of each pair of sidebands substantially equal, second integrating means for additionally integrating said integrated detected signals an odd number of times, second comparison means connected for comparing said detected signals after said additional integration to obtain a weighted representation of difference in the phase displacement of said pairs of sidebands with respect to said center frequency, and means for connecting the output of said second comparison means to said source for maintaining said phase displacement equal with respect to said center frequency.

14. A control circuit for maintaining a source of signals made up of a center frequency and a plurality of pairs of sidebands such that each pair has substantially equal amplitude and substantially equal and opposite phase displacement from said center frequency comprising, said source of signals, first detecting means for in-phase detecting said signals with respect to said center frequency, second detecting means for quadrature detecting said signals with respect to said center frequency, the inputs of said first and said second detecting means being connected to said source of signals, differentiating means connected serially with the output of said detecting means for differentiating the output of said detecting means an odd number of times, first multiplying means for multiplying said detected signals after differentiation to obtain a weighted representation of the amplitude difference of said sidebands, means for connecting the output of said first multiplying means to said source for maintaining the amplitude of each pair of sidebands substantially equal, means for integrating said detected signals after differentiating an odd number of times at least two more times than said odd number of differentiations, second multiplying means for multiplying said detected signals after said differentiating and integrating to obtain a weighted representation of difference in the phase displacement of said pair of sidebands with respect to said center frequency, and means for connecting the output of said second multiplying means to said source for maintaining said phase displacements equal with respect to said center frequency.

15. A control circuit for maintaining a source of signals made up of a center frequency and a plurality of pairs of sidebands such that each pair has substantially equal amplitude comprising, said source of signals, first detecting means for in-phase detecting said signals with respect to said center frequency, second detecting means for quadrature detecting said signals with respect to said center frequency, the input of said first and said second detecting means being connected to said input means, differentiating means serially connected to the output of said detecting means for differentiating the output of said detecting means an odd number of times, means for multiplying said detected signals after differentiation to obtain a weighted representation of the amplitude difference of said sidebands, and means for connecting the output of said multiplying means to said source for maintaining the amplitude of each pair of sidebands substantially equal.

16. A control circuit for maintaining a source of signals made up of a center frequency and at least one upper and one lower sideband such that each corresponding upper and lower sideband maintains a given amplitude difference and a given difference in phase displacement with respect to said center frequency comprising, said source of signals, first detecting means for in-phase detecting said signals with respect to said center frequency, second detecting means for quadrature detecting said signals with respect to said center frequency, the inputs of said first and said second detecting means being connected to said source of signals, first comparison means connected to the outputs of said first and said second detecting means for comparing the output of the in-phase and quadrature detecting means to obtain a first representation of difference in the phase displacement of said sidebands with respect to the phase of said center frequency, means for adding a bias to said first measure, means for connecting said biased first measure to said source for maintaining said given difference in phase displacement, phase shifting means connected to the output of one of said detecting means for shifting the output substantially 90°, second comparison means connected to the output of said phase shifting means and the output of the other of said detecting means to obtain a second representation of amplitude differences of said sidebands, means for adding a bias to said second measure, and means for connecting said biased second measure to said source for maintaining said given amplitude difference.

17. In combination, a source of signals containing a reference frequency component and at least one upper and one lower frequency component, first detecting means for detecting the components of said upper and lower frequencies with respect to a first frequency displaced from said reference frequency by a given amount, second detecting means for detecting the components of said upper and lower frequencies with respect to a second frequency displaced from said referenced frequency by a different given amount, means for connecting the inputs of said first and said second detecting means to said source of signals, and comparison means connected to the outputs of said first and said second detecting means for comparing said detected components to obtain a representation of the relationship of said upper and lower frequencies with respect too said reference frequency.

18. A sensing circuit comprising, input means adapted for connection to a source of signals having a center frequency and at least one upper and one lower sideband, first detecting means for in-phase detecting said signals with respect to said center frequency, second detecting means for quadrature detecting said signals with respect to said center frequency, means for connecting the inputs of said first and said second detecting means to said input means, first means connected to the outputs of said first and second detecting means for detecting the component of said detected quadrature signal which is in phase with said detected in-phase signal to obtain a representation of difference in the phase displacement of said sidebands with respect to the phase of said center frequency, and second means connected to the outputs of said first and second detecting means to detect the component of said detected quadrature signal which is in quadrature phase with said detected in-phase signal to obtain a representation of the amplitude difference of said sidebands.

References Cited in the file of this patent

UNITED STATES PATENTS

| | | |
|---|---|---|
| 2,272,840 | Hammond | Feb. 10, 1942 |
| 2,303,542 | Goddard | Dec. 1, 1942 |
| 2,405,203 | Goldstein | Aug. 6, 1946 |
| 2,481,659 | Guanella | Sept. 14, 1949 |
| 2,522,369 | Guanella | Sept. 12, 1950 |
| 2,524,702 | Hansell | Oct. 3, 1950 |
| 2,580,148 | Wirkler | Dec. 25, 1951 |
| 2,588,094 | Eaton | Mar. 4, 1952 |
| 2,605,396 | Cheek | July 29, 1952 |
| 2,622,127 | Alsberg et al. | Dec. 16, 1952 |
| 2,651,673 | Fredendall | Sept. 8, 1953 |
| 2,714,663 | Norton | Aug. 2, 1955 |
| 2,723,345 | Lewinter | Nov. 8, 1955 |
| 2,772,350 | Deardoff | Nov. 27, 1956 |
| 2,833,923 | Gruen | May 6, 1958 |
| 2,924,706 | Sassler | Feb. 9, 1960 |

FOREIGN PATENTS

| | | |
|---|---|---|
| 472,643 | Canada | Apr. 3, 1951 |